United States Patent [19]

Mooney

[11] Patent Number: 4,817,415
[45] Date of Patent: Apr. 4, 1989

[54] FLUID LINE LEAK DETECTOR

[75] Inventor: Joseph R. Mooney, New Orleans, La.

[73] Assignee: Pan Am Environmental Systems, Inc., Cape Canaveral, Fla.

[21] Appl. No.: 132,179

[22] Filed: Dec. 14, 1987

[51] Int. Cl.⁴ .......................... G01M 3/04; F17D 3/04
[52] U.S. Cl. .................................................. 73/40.5 R
[58] Field of Search ................. 73/40, 40.5 R; 222/52

[56] References Cited

U.S. PATENT DOCUMENTS

| 3,817,087 | 6/1974 | Mooney | 73/40.5 R |
| 3,940,020 | 2/1976 | McCrory et al. | 73/40.5 R |
| 4,051,716 | 10/1977 | Mooney | 73/40.5 R |

Primary Examiner—Stewart J. Levy
Assistant Examiner—Hezron E. Williams
Attorney, Agent, or Firm—Walker & McKenzie

[57] ABSTRACT

An improved fluid line leak detector of the type including a casing attached to the fluid line having a passageway therethrough forming an integral part of the fluid line, including a valve located within the passageway of the casing for dividing the fluid line into upstream and downstream portions and movable between an open position in which fluid can freely flow from the upstream portion to the downstream portion, and including an auxiliary flow passageway extending between the upstream and downstream portions of the fluid line for providing a passageway from the upstream portion to the downstream portion when the valve is in the closed position. The improvement includes a bar member movably attached to the casing within the passageway for movement between a first position in which the valve is free to move from the closed position to the open position and a second position in which the valve is prevented from moving to the open position; and a receptacle associated with the bar member and the auxiliary flow passageway for causing the bar member to move to the second position any time the valve is in the closed position and fluid passes through the auxiliary flow passageway from the upstream portion to the downstream portion of the fluid line.

14 Claims, 1 Drawing Sheet

U.S. Patent  Apr. 4, 1989  4,817,415
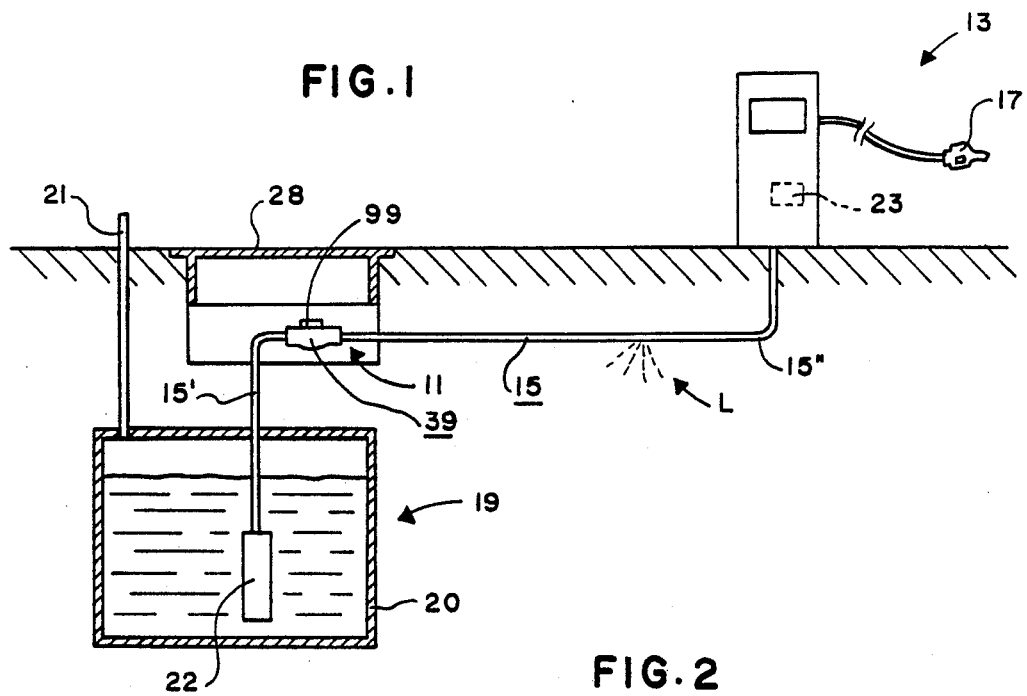
FIG.1
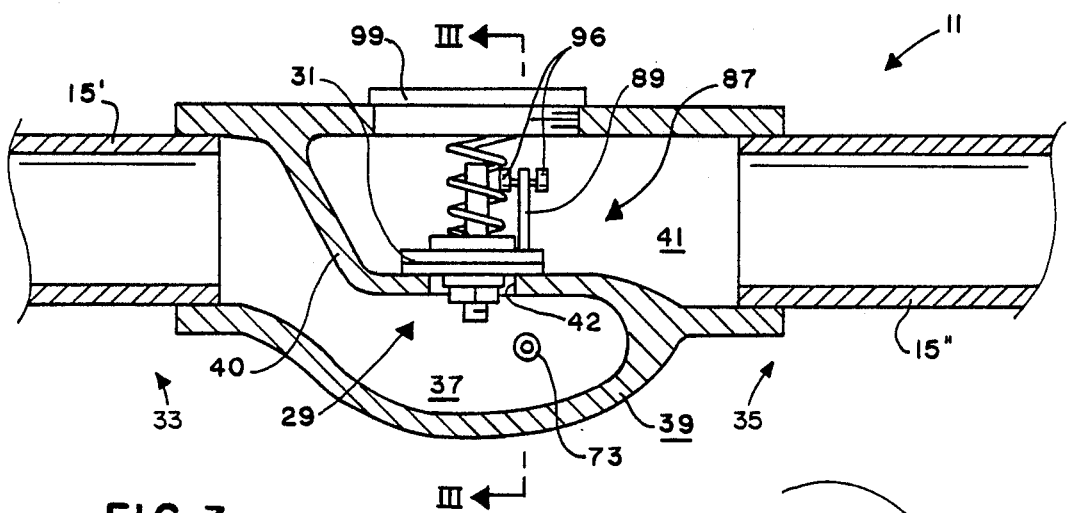
FIG.2
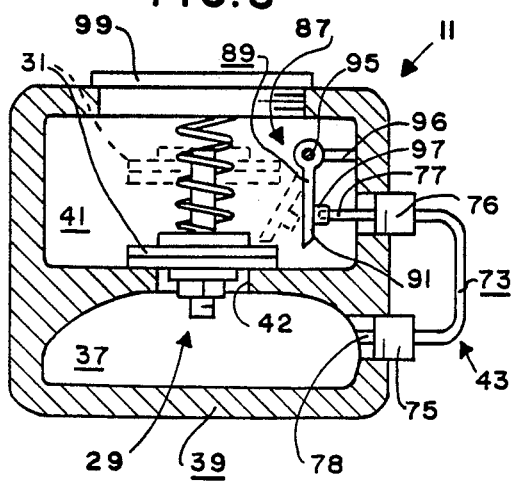
FIG.3
FIG.4

FLUID LINE LEAK DETECTOR

BACKGROUND OF THE INVENTION

1. Field of the Invention

The present invention relates, in general, to means for detecting leaks in a pressurized fluid system and, more specifically, to an improved fluid line leak detector.

2. Description of the Related Art:

The present inventor is the inventor of Mooney, U.S. Pat. No. 3,817,087, issued June 18, 1974. The U.S. Pat. No. 3,817,087 discloses a fluid line leak detector which includes a casing for being disposed in the fluid line, a poppet valve for controlling the passage of fluid through the casing, and a bypass passageway for allowing a small amount of fluid to bypass the poppet valve. A blocking member is provided in the casing downstream of the poppet valve for preventing the poppet valve from fully opening in the event of a leak in the fluid line downstream of the casing. More specifically, a "water wheel" is coupled to the blocking member and is associated with the discharge end of the bypass passageway for moving the blocking member to the blocking position in the event of a leak downstream of the bypass passageway. The present invention is an improvement of the 3,817,087 patent and is not disclosed or suggested thereby.

SUMMARY OF THE INVENTION

The present invention is directed toward providing an improved fluid line leak detector. The concept of the present invention relates in general to an improvement of the blocking means disclosed in Mooney, U.S. Pat. No. 3,817,087.

The improved fluid line leak detector of the present invention includes a casing attached to a fluid line and having a passageway therethrough forming an integral part of the fluid line, includes a valve located within the passageway of the casing for dividing the fluid line into upstream and downstream portions and movable between an open position in which fluid can freely flow from the upstream portion to the downstream portion; includes an auxiliary flow passageway extending between the upstream and downstream portions of the fluid line for providing a passageway from the upstream portion to the downstream portion when the valve is in the closed position, includes a bar member movably attached to the casing within the passageway for movement between a first position in which the valve is free to move from the closed position to the open position and a second position in which the valve is prevented from moving to the open position; and includes receptacle means associated with the bar member and the auxiliary flow passageway for causing the bar member to move to the second position any time the valve is in the closed position and fluid passes through the auxiliary flow passageway from the upstream portion to the downstream portion of the fluid line.

BRIEF DESCRIPTION OF THE DRAWINGS

FIG. 1 is a somewhat diagrammatic view of the fluid line leak detector of the present invention shown in combination with a typical automotive service station fuel system.

FIG. 2 is a vertical cross section view through the longitudinal centerline of the fluid line leak detector of the present invention.

FIG. 3 is a sectional view as taken on line III—III of FIG. 2.

FIG. 4 is an enlarged view of a portion of FIG. 3 with certain components shown in moved positions.

DESCRIPTION OF THE PREFERRED EMBODIMENT

The preferred embodiment of the improved fluid line leak detector 11 of the present invention is for use in a fluid system such as, for example, the typical automotive service station fuel system 13 shown somewhat diagrammatically in FIG. 1. Such a fuel system 13 includes a fluid line 15, a discharge or outlet valve 17 coupled to one end of the fluid line 15, and a fluid source 19 coupled to the other end of the fluid line 15. The fluid source 19 typically includes a fluid tank 20 in which fluid such as gasoline is contained. A vent pipe 21 or the like and a pump 22 are typically associated with the fluid tank 20 for allowing fluid to be pumped through the fluid line 15 from the fluid tank 20 to the outlet valve 17 as will now be apparent to those skilled in the art. A pump control switch 23 is typically associated with the outlet valve 17 for starting and stopping the pump 22. The pump control switch 23 preferably includes time-delay means associated with the output valve 17 to cause a 6 or 7 second delay from the time the pump control switch 23 is activated to start the pump 22 until the time the outlet valve 17 can be opened to discharge fluid from the fluid line 15 to an automobile or the like. The specific construction and operation of such a system 13 is well known to those skilled in the art.

The detector 11 is interposed in the system 13 intermediate the pump 22 and the outlet valve 17. The detector 11 may be located below ground level and a "man hole" cover 28 may be provided to provide access to the detector 11. The detector 11 preferably includes a valve 29 having a valve member 31 dividing the system 13 into an upstream portion 33 and a downstream portion 35. The detector 11 includes a hollow housing or casing 39, the interior of which is divided into an upstream chamber 37 and a downstream chamber 41. More specifically, the interior of the casing 39 has a wall 40 dividing it into the upstream and downstream chambers 37, 41. The upstream portion 33 includes the upstream chamber 37, any upstream portion 15' of the fluid line 15 between the valve 29 and the fluid tank 20, and any related passageway upstream of the valve member 31. The downstream portion 35 includes the downstream chamber 41, the downstream portion 15" of the fluid line 15 between the valve 29 and the outlet valve 17, and any related passageway downstream of the valve member 31. The valve member 32 is located between the upstream and downstream chambers 37, 41. More specifically, an aperture 42 is provided through the wall 40 and the valve member 31 is movable between a closed position as shown in solid lines in FIGS. 2 and 3 in which normal flow from the upstream chamber 37 to the downstream chamber 41 through the aperture 42 is prevented, and an open position as shown in broken lines in FIG. 3 and solid lines in FIG. 4 in which normal flow through the aperture 42 is allowed. The detector 11 also includes a bypass passageway or, more accurately, an auxiliary flow passageway means 43 extending between the upstream portion 33 and the downstream portion 35 to provide an auxiliary flow about the valve member 31 in the event of a leak L in the downstream portion 35 (see, in general, FIG. 3).

The auxiliary flow passageway means 43 may include an elongated, hollow tube 73 coupled to the upstream chamber 37 by a compression fitting 75 or the like and coupled to the downstream chamber 41 by a compression fitting 76 or the like. The end 77 of the tube 73 coupled to the downstream chamber 41, or an nozzle member attached to the end 77 of the tube 73, preferably extends into the downstream chamber 41. The end 78 of the tube 73 coupled to the upstream chamber 37 may extend into or otherwise communicate with the upstream chamber 37. Thus, fluid can enter the end 78 of the tube 73 from the upstream chamber 37, pass through the tube 73 and be discharged from the end 76 of the tube 73 into the downstream chamber 41 (see, in general, FIGS. 3 and 4). The auxiliary flow passageway means 43 thus allows fluid to pass from the upstream chamber 37 to the downstream chamber 41 even when the valve member 31 is closed.

The improvement of the present invention relates primarily to a blocking member 87 for preventing the valve member 31 from moving to the fully opened position in the event of a leak in the downstream portion 15" of the fluid line 15. The blocking member 87 is designed generally as shown in FIGS. 2–4 using the lever principle with its mechanical advantage. Thus, the blocking member 87 preferably includes a rigid, elongated bar or bar member 89 having a second end 93 and a second end 93. The first end 91 of the bar member 89 is pivotally attached to the casing 39 via a pivot rod 95 or the like. The pivot rod 95 may be attached to the casing 33 by boss members 96 or the like. The first end 91 of the bar member 89 can thus be pivoted between a first position in which the valve member 31 can freely move to a completely opened position as shown in solid lines in FIG. 3 and in broken lines in FIG. 4 to allow fluid to freely flow through the valve 29, and a second position in which the valve member 31 is prevented from moving to the completely opened position as shown in broken lines in FIG. 3 and in solid lines in FIG. 4 to prevent fluid from freely flowing through the valve 29. A cup or female shaped receptacle 97 is formed into or attached to the bar member 89 adjacent the first end 91 thereof and positioned so that when the bar member 89 is in the first position, the distal end of the nozzle member 77 will be located within the receptacle 97 as shown in solid lines in FIG. 3 and in broken lines in FIG. 4. A counterbalance or counterweight member may be attached adjacent the first end 91 of the bar member 89 to normally urge the bar member 89 to the first position. It will be noted that the receptacle 97 may, in fact, define such a counterweight member although an additional weight may be added if desired. The casing 39 may be provided with a screw-off cap 99 or the like to allow access to the various internal components as will now be apparent to those skilled in the art. A relatively small force exerted into and against the receptacle 97 by fluid passing through the auxiliary flow passageway means 43 from the upstream chamber 37 to the downstream chamber 41 will be effective to move the bar member 89 to the second position as will now be apparent to those skilled in the art. Thus, a very low leakage flow (e.g., 0.25 gallon-per-hour) through the passageway means 43 will cause the bar member 89 to swing out to the second position over the valve member 31 and prevent the valve member 31 from fully opening thereby resulting in restricted output flow from the outlet valve 17 (e.g., 2 to 3 gallons-per-minute). This restricted flow is a "leak signal." If there is no leak and the outlet valve 17 is closed, the fluid pressure on both ends of the passageway means 43 will be substantially equal, there will be no flow through the passageway means 43 and the bar member 89 will remain in the first position. When the outlet valve 17 is opened, the valve member 31 pops open before the bar member 89 can move to the second position and there is full flow from the outlet valve 17. In this circumstance, the bar member 89 is finally pushed out against the side of the valve member 31 toward the second position after the valve member 31 has opened and does not inhibit the opening of the valve member 31.

As thus constructed and used, the present invention provides a fluid line leak detector of the type including a blocking means for preventing full fluid flow through the fluid line in the event of a leak in the fluid line which can be moved to the blocking position by a relatively small force by leakage by-pass liquid from a by-pass passageway.

Although the present invention has been described and illustrated with respect to a preferred embodiment and a preferred use therefor, it is not to be so limited since modifications and changes can be made therein which are within the full intended scope of the invention.

I claim:

1. An improved fluid line leak detector of the type including a casing attached to said fluid line and having a passageway therethrough forming an integral part of said fluid line, including a valve means located within said passageway of said casing for dividing said fluid line into upstream and downstream portions and movable between an open position in which fluid can freely flow from said upstream portion to said downstream portion, and including an auxiliary flow passageway means extending between said upstream and downstream portions of said fluid line for providing a passageway from said upstream portion to said downstream portion when said valve means is in said closed position; wherein the improvement comprises:
    (a) a bar member movably attached to said casing within said passageway for movement between a first position in which said valve means is free to move from said closed position to said open position and a second position in which said valve means is prevented from moving to said open position; and
    (b) receptacle means associated with said bar member and said auxiliary flow passageway means for causing said bar member to move to said second position any time said valve means is in said closed position and fluid passes through said auxiliary flow passageway means from said upstream portion to said downstream portion of said fluid line.

2. The improvement of claim 1 in which said bar member is elongated and includes a first end and a second end, said first end of said bar member being pivotally attached to said casing.

3. The improvement of claim 2 in which said receptacle means includes a cup member attached to said second end of said bar member.

4. The improvement of claim 2 in which said receptacle means is positioned adjacent said second end of said bar member.

5. The improvement of claim 2 in which said auxiliary flow passageway means includes a tube having an entrance end communicating with said upstream portion of said fluid line and having an exit end communicating with said downstream portion of said fluid line, said receptacle means receiving said exit end of said tube when said bar member is in said first position.

6. An improved blocking means for a fluid line leak detector of the type including a casing disposed in a fluid line, a valve member disposed in the casing for movement between a fully open position in which fluid is allowed to flow through said fluid line and a closed position, and auxiliary flow passageway means for allowing a small amount of fluid to bypass said valve member, and for preventing said valve member from moving to said fully open position in the event of a leak downstream of said valve member, wherein said improvement comprises:
(a) a bar member movably attached to said casing for movement between a first position in which said valve member is free to move from said closed position to said fully open position and a second position in which said valve means is prevented from moving to said fully open position; and
(b) receptacle means associated with said bar member and said auxiliary flow passageway means for causing said bar member to move to said second position any time said valve means is in said closed position and fluid passes through said auxiliary flow passageway means from said upstream portion to said downstream portion of said fluid line.

7. The improvement of claim 6 in which said bar member is elongated and includes a first end and a second end, said first end of said bar member being pivotally attached to said casing.

8. The improvement of claim 7 in which said receptacle means includes a cup member attached to second end of said bar member.

9. The improvement of claim 7 in which said receptacle means is positioned adjacent said second end of said bar member.

10. A fluid line leak detector for detecting any fluid leak in a fluid line; said detector comprising, in combination:
(a) a casing attached to said fluid line and having a passageway therethrough forming an integral part of said fluid line;
(b) valve means located within said passageway of said casing for dividing said fluid line into upstream and downstream portions and movable between a fully open position in which fluid can freely flow from said upstream portion to said downstream portion;
(c) auxiliary flow passageway means extending between said upstream and downstream portions of said fluid line for providing a fluid passageway from said upstream portion to said downstream portion when said valve means is in said closed position;
(d) a bar member movably attached to said casing within said passageway for movement between a first position in which said valve means is free to move from said closed position to said fully open position and a second position in which said valve means is prevented from moving to said open position; and
(e) receptacle means associated with said bar member and said auxiliary flow passageway means for causing said bar member to move to said second position any time said valve means is in said closed position and fluid passes through said auxiliary flow passageway means from said upstream portion to said downstream portion of said fluid line.

11. The detector of claim 10 in which said bar member is elongated and includes a first end and a second end, said first end of said bar member being pivotally attached to said casing.

12. The detector of claim 11 in which said receptacle means includes a cup member attached to said second end of said bar member.

13. The detector of claim 11 in which receptacle means is positioned adjacent said second end of said bar member.

14. The detector of claim 11 in which said auxiliary flow passageway means includes a tube having an entrance end communicating with said upstream portion of said fluid line and having a exit end communicating with said downstream portion of said fluid line, said receptacle means receiving said exit end of said tube when said bar member is in said first portion.

* * * * *